United States Patent
Koelzer et al.

(10) Patent No.: US 10,421,540 B1
(45) Date of Patent: Sep. 24, 2019

(54) TILTROTOR AIRCRAFT HAVING OPTIMIZED HOVER CAPABILITIES

(71) Applicant: Bell Helicopter Textron Inc., Fort Worth, TX (US)

(72) Inventors: Helmuth Peter Koelzer, Fort Worth, TX (US); Brad John Roberts, Fort Worth, TX (US); Michael Christopher Burnett, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 720 days.

(21) Appl. No.: 15/447,966

(22) Filed: Mar. 2, 2017

(51) Int. Cl.
*B64C 29/00* (2006.01)
*B64C 27/08* (2006.01)

(52) U.S. Cl.
CPC .......... *B64C 29/0033* (2013.01); *B64C 27/08* (2013.01); *B64C 29/0008* (2013.01); *B64C 2201/024* (2013.01)

(58) Field of Classification Search
CPC . B64C 29/0033; B64C 27/08; B64C 29/0008; B64C 2201/024
USPC ........................................................ 244/12.4
See application file for complete search history.

(56) References Cited

U.S. PATENT DOCUMENTS

| | | | |
|---|---|---|---|
| 7,004,426 B2 | 2/2006 | Kisor | |
| 8,167,234 B1 | 5/2012 | Moore | |
| 2007/0158494 A1* | 7/2007 | Burrage | B64C 29/0033 244/7 R |
| 2009/0236467 A1* | 9/2009 | Heminway | B64C 1/00 244/17.11 |
| 2010/0193644 A1* | 8/2010 | Karem | B64C 3/10 244/7 R |
| 2013/0026302 A1* | 1/2013 | Lee | B64C 3/385 244/7 R |

(Continued)

FOREIGN PATENT DOCUMENTS

| | | |
|---|---|---|
| CN | 203332392 U | 12/2013 |
| CN | 103466088 B | 6/2016 |

(Continued)

OTHER PUBLICATIONS

Burrage, Bob; Studies of a Gunship Escort concept for the MV-22; International Powered Lift Conference, Oct. 5-7, 2010, Philadelphia, PA.

(Continued)

*Primary Examiner* — Christopher P Ellis
(74) *Attorney, Agent, or Firm* — Lawrence Youst PLLC (57) ABSTRACT

A tiltrotor aircraft is operable in a helicopter flight mode and an airplane flight mode. The tiltrotor aircraft has an airframe including a fuselage and a wing. First and second pylon assemblies are respectively coupled to the airframe proximate outboard ends of the wing. Each pylon assembly includes a mast and a proprotor assembly operable to rotate with the mast to generate thrust. The pylon assemblies are rotatable relative to the wing to selectively operate the tiltrotor aircraft between the helicopter flight mode and the airplane flight mode. The thrust of each proprotor assembly has a thrust vector with an inboard angle between about 5 degrees and about 12 degrees relative to an axis parallel to the yaw axis during hover operations, thereby reducing download on the airframe and improving hover efficiency.

20 Claims, 6 Drawing Sheets

(56) References Cited

U.S. PATENT DOCUMENTS

| 2014/0061392 | A1* | 3/2014 | Karem | B64C 29/0033 |
| | | | | 244/7 R |
| 2015/0360775 | A1 | 12/2015 | Arai | |
| 2016/0152329 | A1 | 6/2016 | Tzeng et al. | |
| 2018/0057148 | A1* | 3/2018 | Bosworth | B64C 13/18 |
| 2018/0057159 | A1* | 3/2018 | Ivans | B64C 29/0033 |
| 2018/0079493 | A1* | 3/2018 | Anderson | B64C 23/072 |
| 2018/0237136 | A1* | 8/2018 | Choi | B64C 39/005 |
| 2018/0334251 | A1* | 11/2018 | Karem | B64C 29/0033 |

FOREIGN PATENT DOCUMENTS

| GB | 191017653 A | 5/1911 |
| RU | 2132289 C1 | 6/1999 |

OTHER PUBLICATIONS

European Exam Report; Application No. EP 17194263.4; European Patent Office; dated May 25, 2018.
European Search Report; Application No. EP 17194263.4; European Patent Office; dated May 2, 2018.

* cited by examiner

TILTROTOR AIRCRAFT HAVING OPTIMIZED HOVER CAPABILITIES

TECHNICAL FIELD OF THE DISCLOSURE

The present disclosure relates, in general, to tiltrotor aircraft operable for vertical takeoff and landing in a helicopter flight mode and forward cruising in an airplane flight mode and, in particular, to tiltrotor aircraft having optimized hover capabilities in the helicopter flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compressibility drag rise.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that high disk loading, high induced velocities and a large surface area under the proprotors create high downloads and the fountain effect, which reduce tiltrotor aircraft efficiency during hover operations. Accordingly, a need has arisen for systems and methods for reducing the downloads and the fountain effect during tiltrotor aircraft hover operations.

SUMMARY

In a first aspect, the present disclosure is directed to a tiltrotor aircraft having a yaw axis, a helicopter flight mode and an airplane flight mode. The tiltrotor aircraft has an airframe including a fuselage and a wing. A pair of pylon assemblies is respectively coupled to the airframe proximate outboard ends of the wing. Each pylon assembly includes a mast and a proprotor assembly operable to rotate with the mast to generate thrust. The pylon assemblies are rotatable relative to the wing to selectively operate the tiltrotor aircraft between the helicopter flight mode and the airplane flight mode. The thrust of each proprotor assembly has a thrust vector with an inboard angle between about 5 degrees and about 12 degrees relative to an axis parallel to the yaw axis during hover operations, thereby reducing download on the airframe and improving hover efficiency.

In some embodiments, the inboard angle of each thrust vector may be between about 6 degrees and about 10 degrees relative to the respective parallel axis or may be between about 7 degrees and about 8 degrees relative to the respective parallel axis. In certain embodiments, the inboard angle of the thrust vectors may be generated responsive to inboard flapping of the proprotor assemblies, inboard mast tilt of the pylon assemblies relative to the wing and/or wing dihedral relative to the fuselage.

In a second aspect, the present disclosure is directed to a method of reducing download on the airframe and improving hover efficiency of a tiltrotor aircraft having a yaw axis, a helicopter flight mode and an airplane flight mode. The method includes providing an airframe including a fuselage and a wing with first and second pylon assemblies respectively coupled to the airframe proximate outboard ends of the wing, each pylon assembly including a mast and a proprotor assembly operable to rotate with the mast to generate thrust, the pylon assemblies rotatable relative to the wing to selectively operate the tiltrotor aircraft between the helicopter flight mode and the airplane flight mode; performing a hover operation including generating vertical thrust by rotating the proprotor assemblies; and generating thrust having a thrust vector with an inboard angle between about 5 degrees and about 12 degrees relative to an axis parallel to the yaw axis during the hover operation with each proprotor assembly, thereby reducing download on the airframe and improving hover efficiency.

The method may also include producing thrust having a thrust vector with an inboard angle between about 6 degrees and about 10 degrees relative to the respective parallel axis during the hover operation with each proprotor assembly; producing thrust having a thrust vector with an inboard angle between about 7 degrees and about 8 degrees relative to the respective parallel axis during the hover operation with each proprotor assembly; generating the thrust vectors responsive to inboard flapping of the proprotor assemblies; generating the thrust vectors responsive to inboard mast tilt of the pylon assemblies relative to the wing and/or generating the thrust vectors responsive to wing dihedral relative to the fuselage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
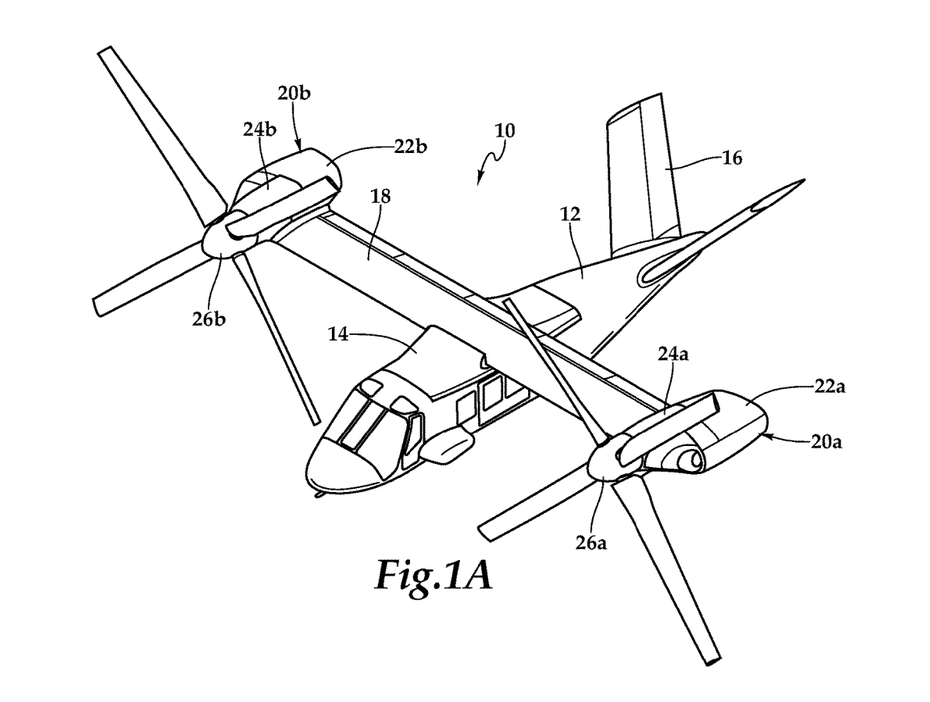
FIGS. 1A-1B are perspective views of a tiltrotor aircraft in airplane flight mode and helicopter flight mode, respectively, in accordance with embodiments of the present disclosure.
Figure 1B:
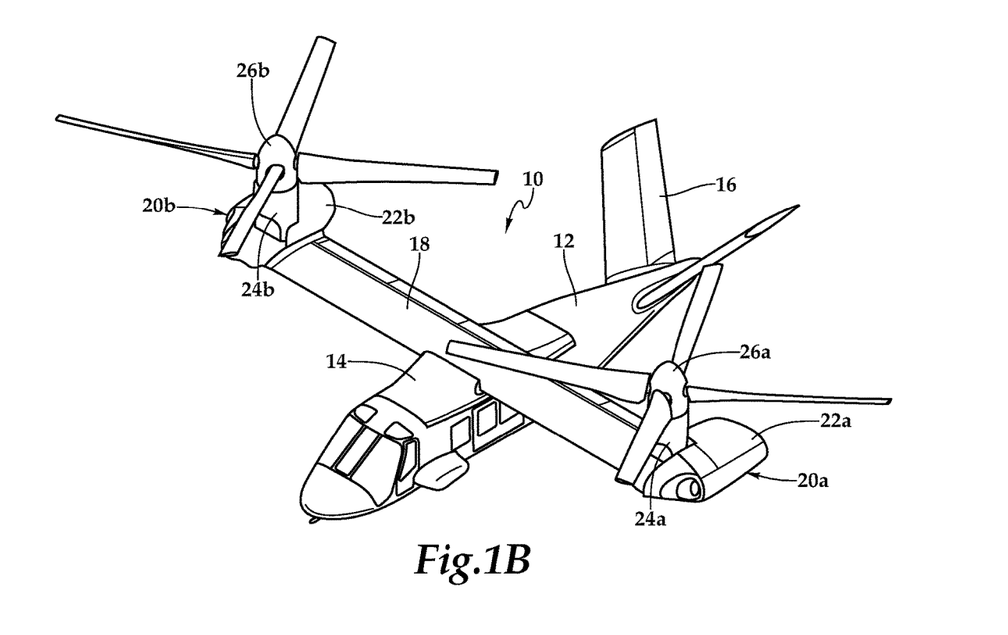

Referring to FIGS. 1A-1B in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally horizontal orientation, as best seen in FIG. 1A, a generally vertical orientation, as best seen in FIG. 1B. Pylon assembly 24a includes a rotatable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally horizontal orientation, as best seen in FIG. 1A, a generally vertical orientation, as best seen in FIG. 1B. Pylon assembly 24b includes a rotatable portion of the drive system and a proprotor assembly 26b that is rotatable responsive to torque and rotational energy provided via the engine and drive system.

FIG. 1A illustrate aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 1B illustrates aircraft 10 in helicopter or VTOL flight mode, in which proprotor assemblies 26a, 26b are rotating in a generally horizontal plane to provide a lifting thrust, such that aircraft 10 flies much like a conventional helicopter. In the illustrated embodiment, proprotor assemblies 26a, 26b each have an inboard tilt enabling proprotor assemblies 26a, 26b to produce thrust having thrust vectors with inboard angles during hover operations, which reduces the download on the airframe and the fountain effect compared proprotor assemblies that produce thrust having thrust vectors without such inboard angles, thereby improving the efficiency of hover operations. As discussed herein, the inboard tilt of proprotor assemblies 26a, 26b may be created in any suitable manner including, for example, responsive to inboard flapping of proprotor assemblies 26a, 26b, inboard mast tilt of pylon assemblies 24a, 24b relative to wing 18 and/or wing dihedral relative to fuselage 12.

It should be appreciated that when aircraft 10 is operated in airplane flight mode, proprotor assemblies 26a, 26b preferably produce thrust having thrust vectors generally parallel with the longitudinal or roll axis of aircraft 10. In addition, it should be appreciated that aircraft 10 can be operated such that proprotor assemblies 26a, 26b are selectively positioned between airplane flight mode and helicopter flight mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having a single engine which may be housed within one of the fixed nacelles or within the fuselage that provides torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include four twisted proprotor blades that are equally spaced apart circumferentially at approximately 90 degree intervals. It should be understood by those having ordinary skill in the art, however, that the proprotor assemblies of the present disclosure could have proprotor blades with other designs and other configurations including proprotor assemblies having either more than or less than four proprotor blades. Further, it should be understood by those having ordinary skill in the art that even though the present embodiments are illustrated in the context of tiltrotor aircraft 10, the embodiments of the present disclosure can be implemented on other types of tiltrotor aircraft including, for example, quad tiltrotor aircraft and unmanned tiltrotor aircraft, to name a few.

Figure 2A:
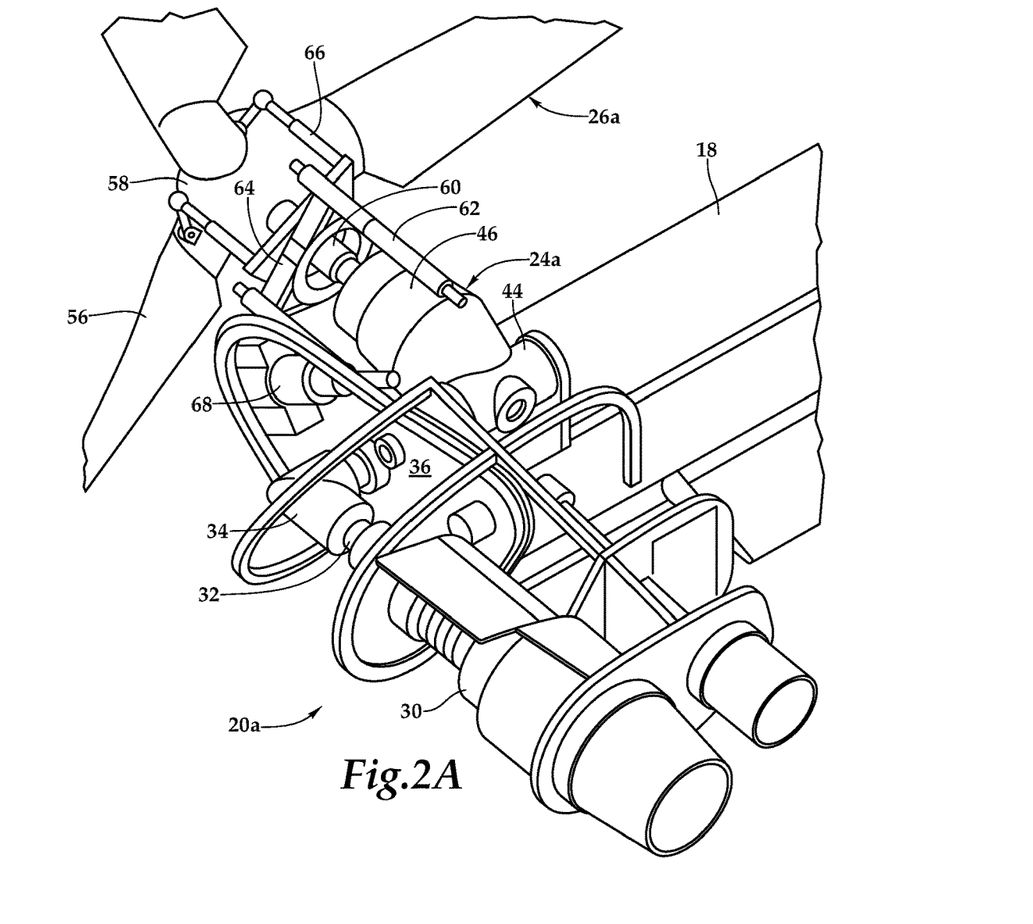
FIGS. 2A-2B are perspective and top views of a propulsion system for a tiltrotor aircraft in accordance with embodiments of the present disclosure.
Figure 2B:
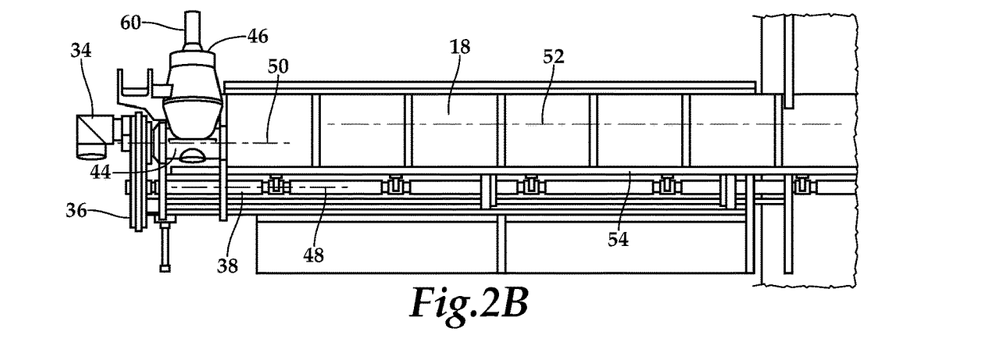

Referring now to FIGS. 2A-2B, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 30 that is fixed relative to wing 18. An engine output shaft 32 transfers power from engine 30 to a spiral bevel gearbox 34 that includes spiral bevel gears to change torque direction by 90 degrees from engine 30 to a fixed gearbox 36. Fixed gearbox 36 includes a plurality of gears, such as helical gears, in a gear train that are coupled to an interconnect drive shaft 38 and an output shaft (not visible). Torque is transferred to an input gear in spindle gearbox 44 of proprotor gearbox 46 by the output shaft.

Interconnect drive shaft 38 provides a torque path that enables a single engine to provide torque to both proprotors assemblies 26a, 26b in the event of a failure of the other engine. In the illustrated embodiment, interconnect drive shaft 38 has a rotational axis 48 that is vertically lower and horizontally aft of a longitudinal axis of the spindle gearbox 44 referred to herein as a conversion axis 50. Conversion axis 50 is parallel to a lengthwise axis 52 of wing 18. Interconnect drive shaft 38 includes a plurality of segments that share rotational axis 48. Locating interconnect drive shaft 38 aft of wing spar 54, which is a structural member of the airframe of tiltrotor aircraft 10, provides for optimal integration with fixed gearbox 36 without interfering with the primary torque transfer of the output shaft between fixed gearbox 36 and spindle gearbox 44. Conversion axis 50 of spindle gearbox 44 is parallel to rotational axis 48 of interconnect drive shaft 38 but located forward and above rotational axis 48.

Proprotor assembly 26a of propulsion system 20a includes a plurality of proprotor blades 56 coupled to a yoke 58 that is coupled to a mast 60. As used herein, the term "coupled" may include direct or indirect coupling by any means, including moving and/or non-moving mechanical connections. Mast 60 is coupled to proprotor gearbox 46. The collective and/or cyclic pitch of proprotor blades 56 may be controlled responsive to pilot input and/or flight control computer input via actuators 62, swashplate 64 and pitch links 66. When it is desired to operate tiltrotor aircraft 10 between helicopter and airplane flight modes, a conversion actuator 68 can be actuated to selectively rotate pylon assembly 24a including proprotor assembly 26a, mast 60, proprotor gearbox 46 and spindle gearbox 44 about conversion axis 50.

Figure 3A:
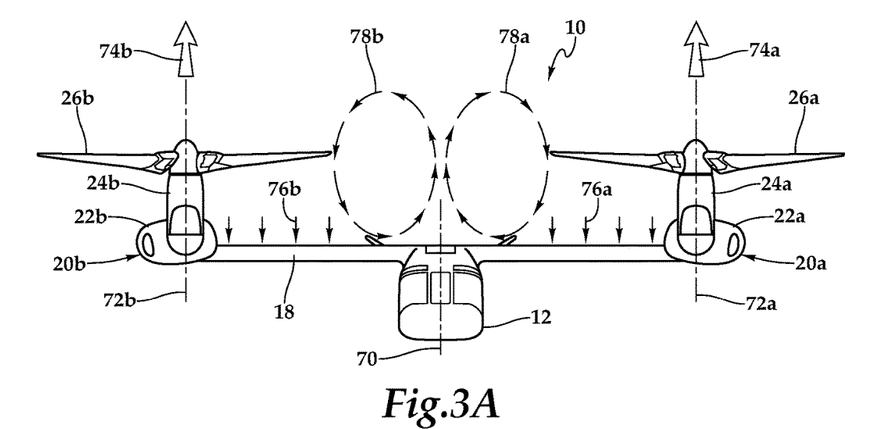
FIG. 3A is a front view of a tiltrotor aircraft depicting thrust vectors and the fountain effect during conventional tiltrotor aircraft hover operations.

Referring to FIG. 3A in the drawings, tiltrotor aircraft 10 is depicted in a conventional hover mode. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. As illustrated, a thrust vector 74a generated by proprotor assembly 26a is coincident with and parallel to axis 72a and a thrust vector 74b generated by proprotor assembly 26b is coincident with and parallel to axis 72b.

In this configuration, however, a certain amount of the hover column of air deflected by proprotor assemblies 26a, 26b creates a download on wing 18 as indicated by arrows 76a, 76b. In addition, another portion of the hover column of air deflected by proprotor assemblies 26a, 26b generates a vortex above fuselage 12, known as the fountain effect, in which air not only creates a download on wing 18 and/or fuselage 12 but also circulates above proprotor assemblies 26a, 26b and is re-ingested by proprotor assemblies 26a, 26b, as indicated by arrows 78a, 78b. The download on wing 18 and fuselage 12 as well as the air re-ingested by proprotor assemblies 26a, 26b due to the fountain effect, reduce the hover efficiency of tiltrotor aircraft 10 as the effective weight of the aircraft is increased and the effective lift generated by the proprotor assemblies 26a, 26b is decreased.

Figure 3B:
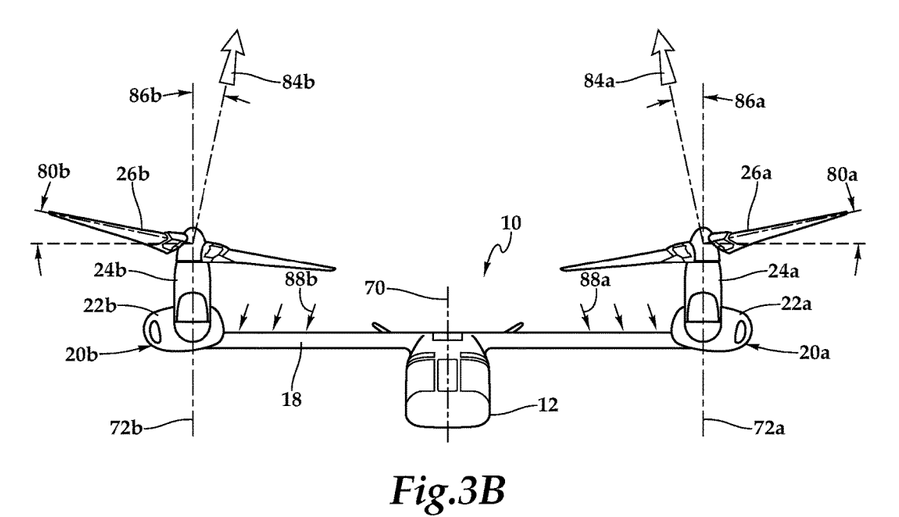
FIGS. 3B-3H are front views of a tiltrotor aircraft depicting thrust vectors having inboard angles during tiltrotor aircraft hover operations in accordance with embodiments of the present disclosure.

Referring to FIG. 3B in the drawings, tiltrotor aircraft 10 is depicted in a hover mode while applying opposing lateral cyclic to the proprotor assemblies. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, opposing lateral cyclic has been applied to proprotor assemblies 26a, 26b such that the proprotor blades flap down toward the inboard path of travel and flap up toward the outboard path of travel, which is referred to herein as inboard flapping of proprotor assemblies 26a, 26b.

In this configuration, proprotor assembly 26a has an inboard flapping angle 80a relative to pylon assembly 24a generating a resultant thrust vector 84a having an angle 86a extending in the inboard direction relative to axis 72a. Likewise, proprotor assembly 26b has an inboard flapping angle 80b relative to pylon assembly 24b generating a resultant thrust vector 84b having an angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12.

The optimum angles 86a, 86b for thrust vectors 84a, 84b will be implementation specific and based upon factors such as the wing area under the proprotor assemblies, the fuselage area under the proprotor assemblies, the wing profile, the fuselage profile, the fixed nacelle profile, the power demand during the hover operation, the vertical component of the resultant thrust vectors as well as other factors known to those having ordinary skill in the art. For example, in one preferred implementation, thrust vector 84a, 84b have inboard angles between about 5 degrees and about 12 degrees relative to respective axes 72a, 72b. In another preferred implementation, thrust vector 84a, 84b have inboard angles between about 6 degrees and about 10 degrees relative to respective axes 72a, 72b. In a further preferred implementation, thrust vector 84a, 84b have inboard angles between about 7 degrees and about 8 degrees relative to respective axes 72a, 72b. It should be understood by those having ordinary skill in the art, however, that thrust vector 84a, 84b having inboard angles less than 5 degrees or greater than 12 degrees relative to respective axes 72a, 72b are possible and are considered to be within the scope of the present disclosure.

Both the use and the magnitude of the opposing lateral cyclic applied to proprotor assemblies 26a, 26b may be responsive to pilot input and/or determinations made by the flight control computer. For example, it may be desirable to apply the opposing lateral cyclic to proprotor assemblies 26a, 26b only under high power demand hover operations such as high altitude hover, high temperature hover, high payload hover or the like. In addition, depending upon the degree of the high power demand and/or other hover conditions, it may be desirable to adjust the magnitude of the opposing lateral cyclic applied to proprotor assemblies 26a, 26b such that the inboard flapping angles of proprotor assemblies 26a, 26b may be fine-tuned within the ranges described above or other suitable ranges to optimize hover performance.

Figure 3C:
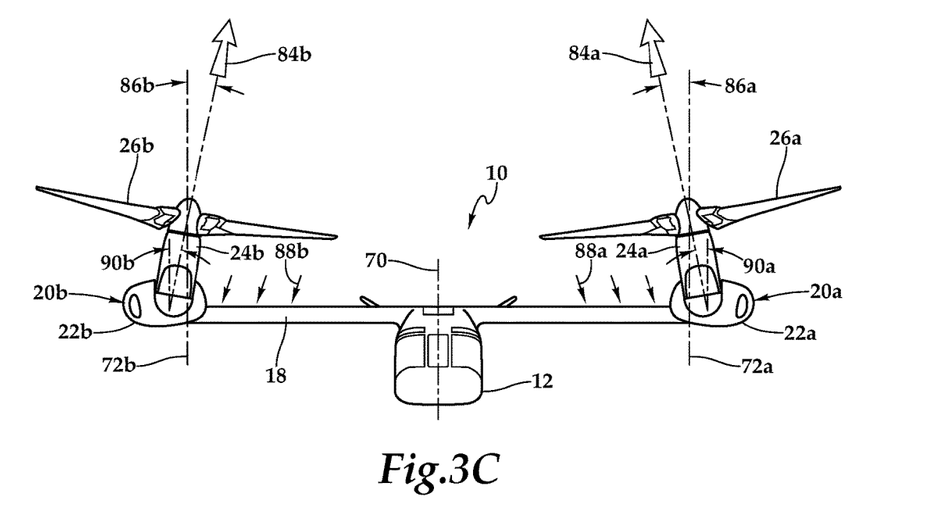

Referring to FIG. 3C in the drawings, tiltrotor aircraft 10 is depicted in a hover mode including inboard mast tilt of the pylon assemblies. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, inboard mast tilt of pylon assemblies 24a, 24b relative to wing 18 results in an inboard tilt of proprotor assemblies 26a, 26b.

In this configuration, the inboard mast tilt of pylon assembly 24a has an inboard mast tilt angle of 90a relative to wing 18 generating a resultant thrust vector 84a having angle 86a extending in the inboard direction relative to axis 72a. Likewise, the inboard mast tilt of pylon assembly 24b has an inboard mast tilt angle of 90b relative to wing 18 generating a resultant thrust vector 84b having angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12.

Figure 3D:
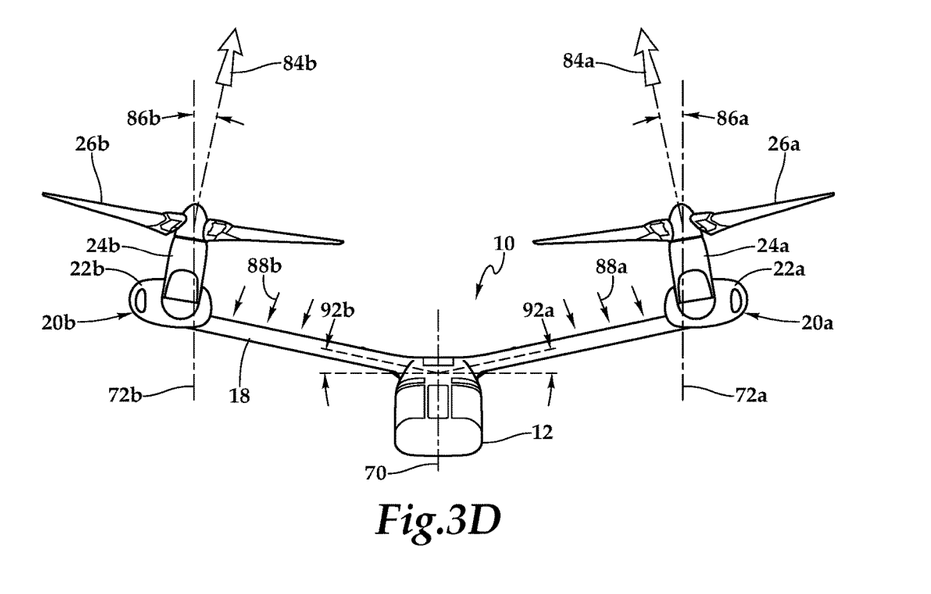

Referring to FIG. 3D in the drawings, tiltrotor aircraft 10 is depicted in a hover mode including wing dihedral. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, wing 18 forms a dihedral angle relative to fuselage 12 resulting in an inboard tilt of proprotor assemblies 26a, 26b.

In this configuration, the right side of wing 18 has a dihedral angle 92a relative to the horizontal which generates a resultant thrust vector 84a having angle 86a extending in the inboard direction relative to axis 72a. Likewise, the left side of wing 18 has a dihedral angle 92b relative to the horizontal which generates a resultant thrust vector 84b having angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12.

Figure 3E:
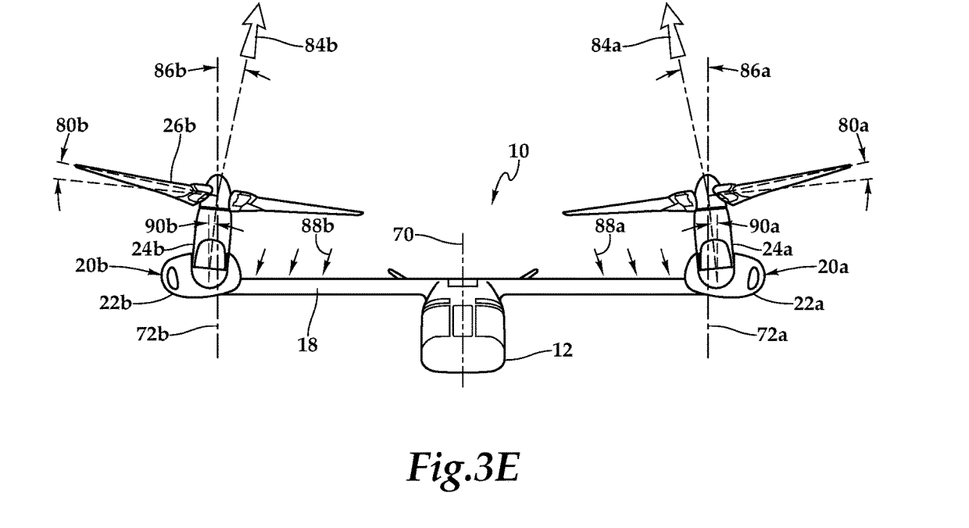

Referring to FIG. 3E in the drawings, tiltrotor aircraft 10 is depicted in a hover mode including inboard mast tilt of the pylon assemblies, while applying opposing lateral cyclic to the proprotor assemblies. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, inboard mast tilt of pylon assemblies 24a, 24b relative to wing 18 is coupled with inboard flapping of proprotor assemblies 26a, 26b.

In this configuration, the inboard mast tilt of pylon assembly 24a has an inboard mast tilt angle of 90a relative to wing 18 and proprotor assembly 26a has an inboard flapping angle 80a relative to pylon assembly 24a which together generate a resultant thrust vector 84a having angle 86a extending in the inboard direction relative to axis 72a. Likewise, the inboard mast tilt of pylon assembly 24b has an inboard mast tilt angle of 90b relative to wing 18 and proprotor assembly 26b has an inboard flapping angle 80b relative to pylon assembly 24b which together generate a resultant thrust vector 84b having angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12. It is noted that the inboard mast tilt of pylon assemblies 24a, 24b relative to wing 18 may provide a static component to angles 86a, 86b while the inboard flapping angles of proprotor assemblies 26a, 26b may provide a variable or dynamic component to angles 86a, 86b responsive to the magnitude of the opposing lateral cyclic applied to proprotor assemblies 26a, 26b such that hover performance can be optimized based upon the hover conditions.

Figure 3F:
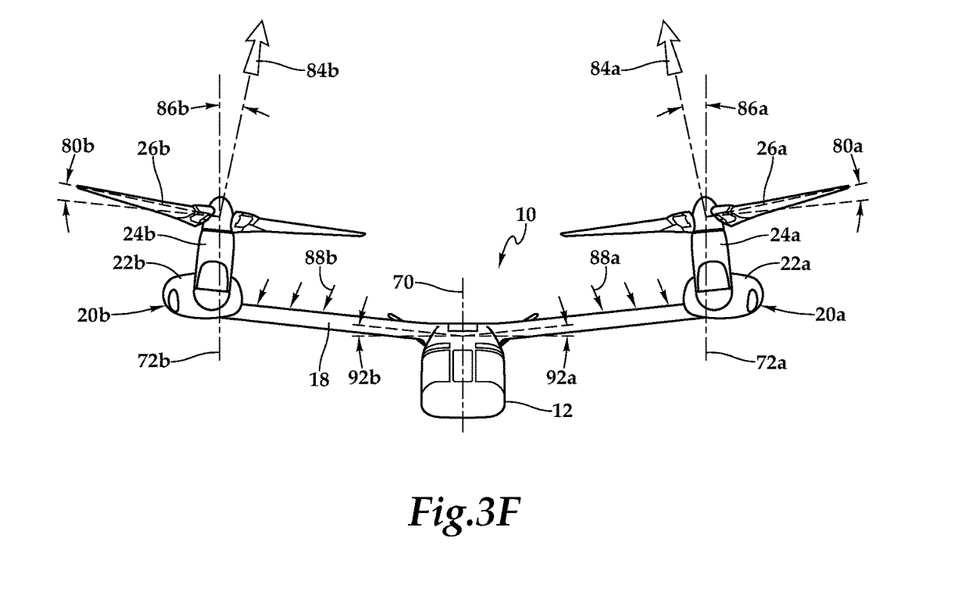

Referring to FIG. 3F in the drawings, tiltrotor aircraft 10 is depicted in a hover mode including wing dihedral, while applying opposing lateral cyclic to the proprotor assemblies. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, wing dihedral is coupled with inboard flapping of proprotor assemblies 26a, 26b.

In this configuration, the right side of wing 18 has a dihedral angle 92a relative to the horizontal and proprotor assembly 26a has an inboard flapping angle 80a relative to pylon assembly 24a which together generate a resultant thrust vector 84a having angle 86a extending in the inboard direction relative to axis 72a. Likewise, the left side of wing 18 has a dihedral angle 92b relative to the horizontal and proprotor assembly 26b has an inboard flapping angle 80b relative to pylon assembly 24b which together generate a resultant thrust vector 84b having angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12. It is noted that the wing dihedral may provide a static component to angles 86a, 86b while the inboard flapping angles of proprotor assemblies 26a, 26b may provide a variable or dynamic component to angles 86a, 86b responsive to the magnitude of the opposing lateral cyclic applied to proprotor assemblies 26a, 26b such that hover performance can be optimized based upon the hover conditions.

Figure 3G:
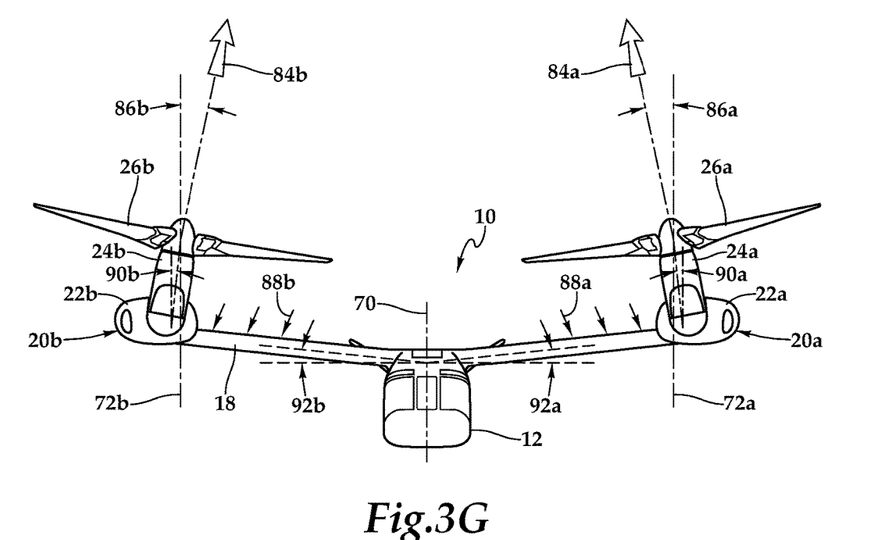

Referring to FIG. 3G in the drawings, tiltrotor aircraft 10 is depicted in a hover mode including wing dihedral and inboard mast tilt of the pylon assemblies. Aircraft 10 includes a fuselage 12 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, wing dihedral and inboard mast tilt of pylon assemblies 24a, 24b result in an inboard tilt of proprotor assemblies 26a, 26b.

In this configuration, the right side of wing 18 has a dihedral angle 92a relative to the horizontal and the inboard mast tilt of pylon assembly 24a has an inboard mast tilt angle of 90a relative to wing 18 which together generate a resultant thrust vector 84a having angle 86a extending in the inboard direction relative to axis 72a. Likewise, the left side of wing 18 has a dihedral angle 92b relative to the horizontal and the inboard mast tilt of pylon assembly 24b has an inboard mast tilt angle of 90b relative to wing 18 which together generate a resultant thrust vector 84b having angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12.

Figure 3H:
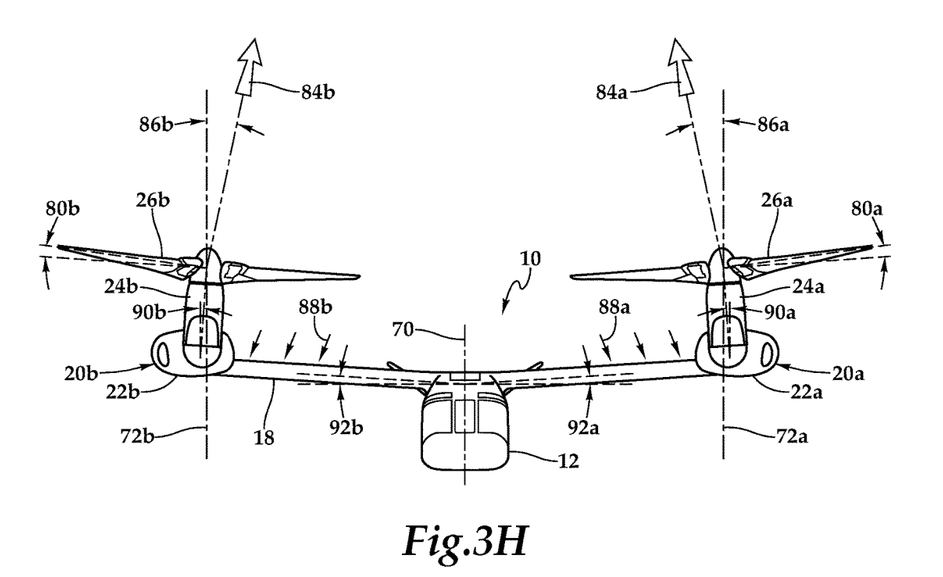

Referring to FIG. 3H in the drawings, tiltrotor aircraft 10 is depicted in a hover mode including wing dihedral and inboard mast tilt of the pylon assemblies, while applying opposing lateral cyclic to the proprotor assemblies. Aircraft 10 includes a fuselage 12, a wing mount assembly 14, a tail assembly 16 and a wing 18. Located proximate the outboard ends of wing 18 are propulsion assemblies 20a, 20b that respectively include fixed nacelles 22a, 22b, pylon assemblies 24a, 24b and proprotor assemblies 26a, 26b. Aircraft 10 has a yaw axis 70, a generally vertical axis 72a and a generally vertical axis 72b. Axis 72a passes through the center of rotation of proprotor assembly 26a. Axis 72b passes through the center of rotation of proprotor assembly 26b. Axis 72a and axis 72b are parallel with yaw axis 70 during hover operations. In the illustrated embodiment, wing dihedral and inboard mast tilt of pylon assemblies 24a, 24b are coupled with inboard flapping of proprotor assemblies 26a, 26b.

In this configuration, the right side of wing 18 has a dihedral angle 92a relative to the horizontal, the inboard mast tilt of pylon assembly 24a has an inboard mast tilt angle of 90a relative to wing 18 and proprotor assembly 26a has an inboard flapping angle 80a relative to pylon assembly 24a which together generate a resultant thrust vector 84a having angle 86a extending in the inboard direction relative to axis 72a. Likewise, the left side of wing 18 has a dihedral angle 92b relative to the horizontal, the inboard mast tilt of pylon assembly 24b has an inboard mast tilt angle of 90b relative to wing 18 and proprotor assembly 26b has an inboard flapping angle 80b relative to pylon assembly 24b which together generate a resultant thrust vector 84b having angle 86b extending in the inboard direction relative to axis 72b. By redirecting thrust vectors 84a, 84b inboard relative to axes 72a, 72b, the portion of the hover column of air deflected by proprotor assemblies 26a, 26b that creates a download on wing 18 is reduced, as indicated by arrows 88a, 88b. In addition, the portion of the hover column of air deflected by proprotor assemblies 26a, 26b that generates the fountain effect, is eliminated or significantly reduced as indicated by the lack of arrows circulating above fuselage 12. It is noted that the wing dihedral and the inboard mast tilt of pylon assemblies 24a, 24b relative to wing 18 may provide a static component to angles 86a, 86b while the inboard flapping angles of proprotor assemblies 26a, 26b may provide a variable or dynamic component to angles 86a, 86b responsive to the magnitude of the opposing lateral cyclic applied to proprotor assemblies 26a, 26b such that hover performance can be optimized based upon the hover conditions.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltrotor aircraft having a yaw axis, a helicopter flight mode and an airplane flight mode, the tiltrotor aircraft comprising:
    an airframe including a fuselage and a wing; and
    first and second pylon assemblies respectively coupled to the airframe proximate outboard ends of the wing, each pylon assembly including a mast and a proprotor assembly operable to rotate with the mast to generate thrust, the pylon assemblies rotatable relative to the wing to selectively operate the tiltrotor aircraft between the helicopter flight mode and the airplane flight mode;
    wherein, the thrust of each proprotor assembly has thrust vector with an inboard angle between about 5 degrees and about 12 degrees relative to an axis parallel to the yaw axis during hover operations, thereby reducing download on the airframe and improving hover efficiency.

2. The tiltrotor aircraft as recited in claim 1 wherein the inboard angle of each thrust vector is between about 6 degrees and about 10 degrees relative to the respective axis parallel to the yaw axis.

3. The tiltrotor aircraft as recited in claim 1 wherein the inboard angle of each thrust vector is between about 7 degrees and about 8 degrees relative to the respective axis parallel to the yaw axis.

4. The tiltrotor aircraft as recited in claim 1 wherein the inboard angle of each thrust vector is generated responsive to inboard flapping of the proprotor assemblies.

5. The tiltrotor aircraft as recited in claim 1 wherein the inboard angle of each thrust vector is generated responsive to inboard mast tilt of the pylon assemblies relative to the wing.

6. The tiltrotor aircraft as recited in claim 1 wherein the inboard angle of each thrust vector is generated responsive to wing dihedral relative to the fuselage.

7. The tiltrotor aircraft as recited in claim 1 wherein the inboard angle of each thrust vector is generated responsive to a combination of inboard flapping of the proprotor assemblies and inboard mast tilt of the pylon assemblies relative to the wing.

8. The tiltrotor aircraft as recited in claim 1 wherein the inboard angle of each thrust vector is generated responsive to a combination of inboard flapping of the proprotor assemblies and wing dihedral relative to the fuselage.

9. The tiltrotor aircraft as recited in claim 1 wherein the inboard angle of each thrust vector is generated responsive to a combination of inboard mast tilt of the pylon assemblies relative to the wing and wing dihedral relative to the fuselage.

10. The tiltrotor aircraft as recited in claim 1 wherein the inboard angle of each thrust vector is generated responsive to a combination of inboard flapping of the proprotor assemblies, inboard mast tilt of the pylon assemblies relative to the wing and wing dihedral relative to the fuselage.

11. A method of reducing download and improving hover efficiency of a tiltrotor aircraft having a yaw axis, a helicopter flight mode and an airplane flight mode, the method comprising:
    providing an airframe including a fuselage and a wing with first and second pylon assemblies respectively coupled to the airframe proximate outboard ends of the wing, each pylon assembly including a mast and a proprotor assembly operable to rotate with the mast to generate thrust, the pylon assemblies rotatable relative to the wing to selectively operate the tiltrotor aircraft between the helicopter flight mode and the airplane flight mode;
    performing a hover operation including generating vertical thrust by rotating the proprotor assemblies; and
    generating thrust having a thrust vector with an inboard angle between about 5 degrees and about 12 degrees relative to an axis parallel to the yaw axis during the hover operation with each proprotor assembly, thereby reducing download on the airframe and improving hover efficiency.

12. The method claim 11 further comprising generating thrust having a thrust vector with an inboard angle between about 6 degrees and about 10 degrees relative to the respective axis parallel to the yaw axis during the hover operation with each proprotor assembly.

13. The method claim 11 further comprising generating thrust having a thrust vector with an inboard angle between about 7 degrees and about 8 degrees relative to the respective axis parallel to the yaw axis during the hover operation with each proprotor assembly.

14. The method claim 11 further comprising generating the thrust vectors responsive to inboard flapping of the proprotor assemblies.

15. The method claim 11 further comprising generating the thrust vectors responsive to inboard mast tilt of the pylon assemblies relative to the wing.

16. The method claim 11 further comprising generating the thrust vectors responsive to wing dihedral relative to the fuselage.

17. The method claim 11 further comprising generating the thrust vectors responsive to a combination of inboard flapping of the proprotor assemblies and inboard mast tilt of the pylon assemblies relative to the wing.

18. The method claim 11 further comprising generating the thrust vectors responsive to a combination of inboard flapping of the proprotor assemblies and wing dihedral relative to the fuselage.

19. The method claim 11 further comprising generating the thrust vectors responsive to a combination of inboard mast tilt of the pylon assemblies relative to the wing and wing dihedral relative to the fuselage.

20. The method claim 11 further comprising generating the thrust vectors responsive to a combination of inboard flapping of the proprotor assemblies, inboard mast tilt of the pylon assemblies relative to the wing and wing dihedral relative to the fuselage.

* * * * *

UNITED STATES PATENT AND TRADEMARK OFFICE
CERTIFICATE OF CORRECTION

| | | |
|---|---|---|
| PATENT NO. | : 10,421,540 B1 | Page 1 of 1 |
| APPLICATION NO. | : 15/447966 | |
| DATED | : September 24, 2019 | |
| INVENTOR(S) | : Koelzer et al. | |

It is certified that error appears in the above-identified patent and that said Letters Patent is hereby corrected as shown below:

In the Claims

Column 11, Line 18 In Claim 1:
"wherein, the thrust of each proprotor assembly has thrust" should read --wherein, the thrust of each proprotor assembly has a thrust--

Signed and Sealed this
Fifth Day of November, 2019

Andrei Iancu
*Director of the United States Patent and Trademark Office*